United States Patent [19]

Antolino et al.

[11] 4,309,823
[45] Jan. 12, 1982

[54] ROTARY KITCHEN UTENSIL

[75] Inventors: Angelo Antolino, Pelham, N.Y.; Vincent Angelo, 56 Sherbrooke Dr., Smithtown, N.Y. 11787; Joseph Angelo, 1061 Grant Ave., Pelham, N.Y. 10803

[73] Assignees: Vincent Angelo, Smithtown; Joseph Angelo, Pelham, both of N.Y.

[21] Appl. No.: 179,031

[22] Filed: Aug. 18, 1980

[51] Int. Cl.³ .............................................. A47J 43/04
[52] U.S. Cl. ................................. 30/276; 241/169.1; 241/169.2
[58] Field of Search .................... 30/276, 310; 145/53; 241/168, 169, 169.1, 169.2

[56] References Cited

U.S. PATENT DOCUMENTS

| 400,547 | 4/1889 | Crafton | 145/53 X |
| 427,473 | 5/1890 | Hauck | 145/53 X |
| 2,575,978 | 11/1951 | Scheidecker | 241/169.1 |
| 2,785,718 | 3/1957 | Moos | 241/169.2 |
| 3,534,794 | 10/1970 | Schilbred | 241/169.1 |

Primary Examiner—Jimmy C. Peters
Attorney, Agent, or Firm—Natter & Natter

[57] ABSTRACT

A hand-held kitchen utensil having a manually operable rotary drive mechanism including a helical grooved spindle housed within a tubular protective sleeve. The drive mechanism is actuated by the alternate application of a substantially vertically directed downward force which slidably displaces the sleeve. Upon removal of said force, a restoring spring force returns the protective sleeve to its initial position. This reciprocal sleeve movement is effective for rotating the spindle and an attached circular blade in respective clockwise and counterclockwise directions. A plurality of arcuate support bands extend from the circular blade and form auxiliary food mixing elements. The invention also encompasses the selective utilization of interchangeable blades which can be attached for specific food processing requirements.

10 Claims, 4 Drawing Figures

U.S. Patent     Jan. 12, 1982     4,309,823
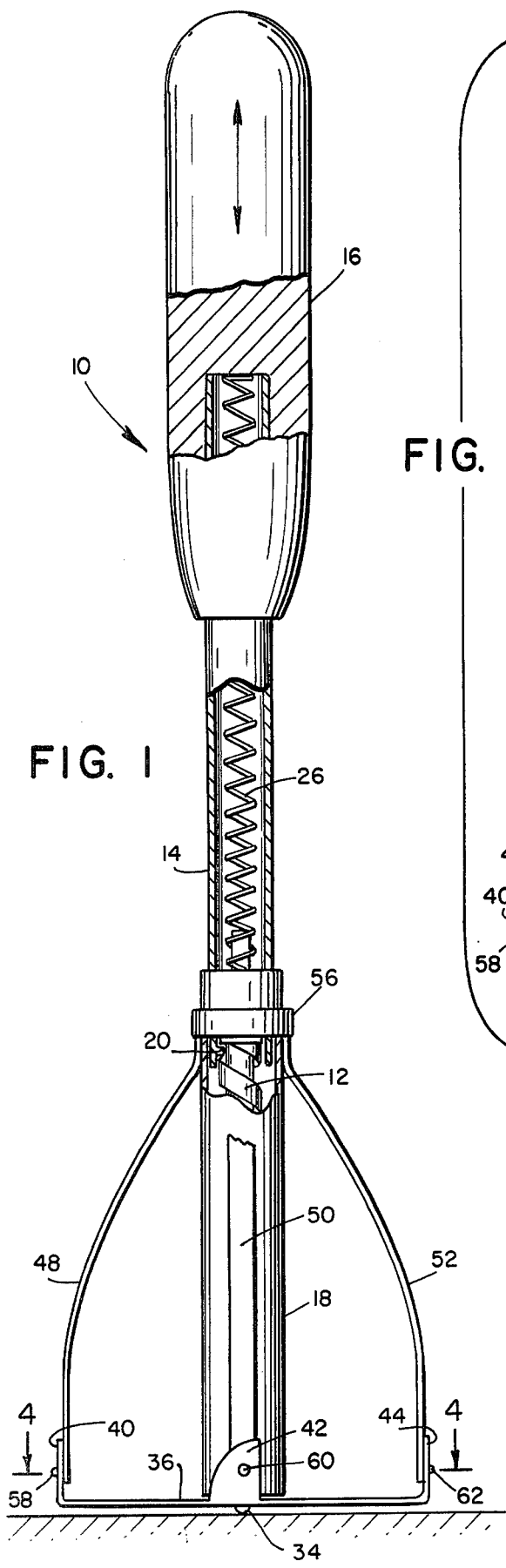
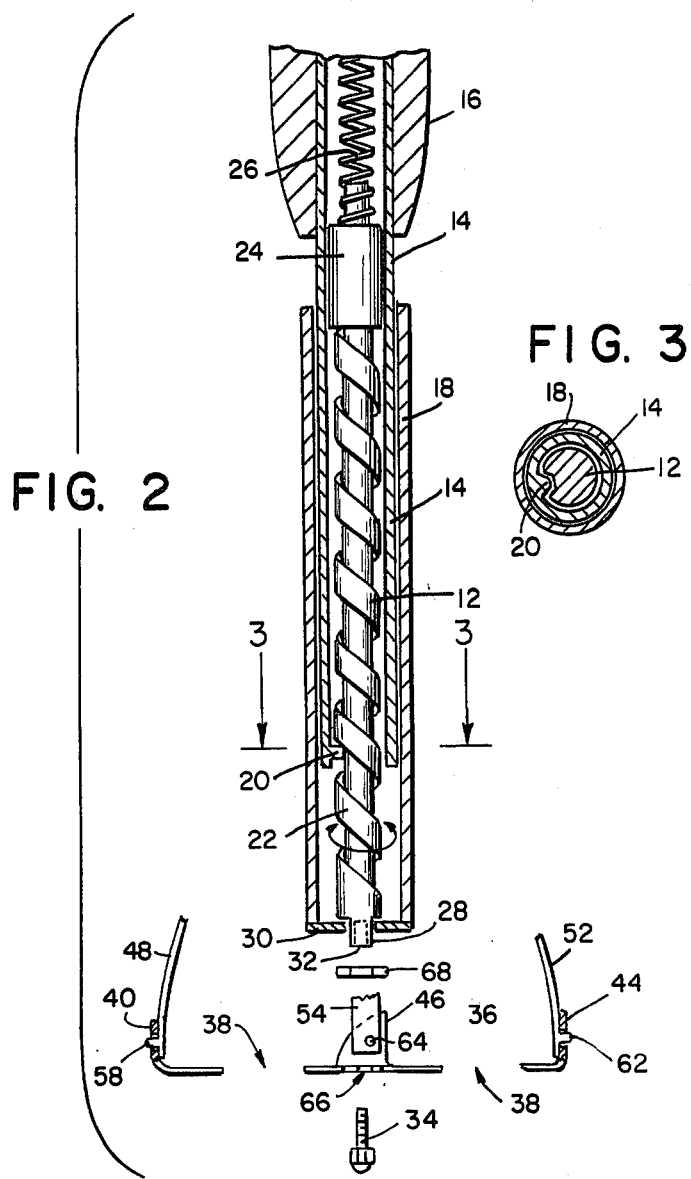
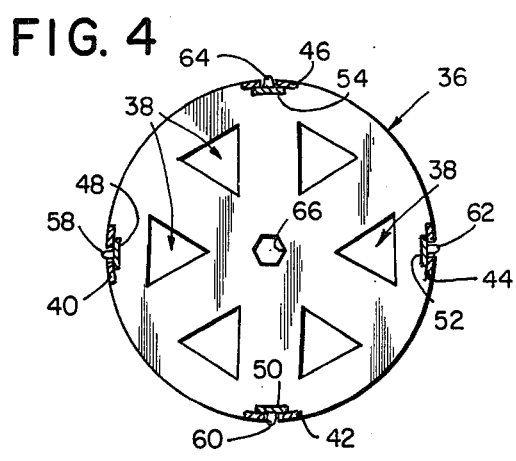

ROTARY KITCHEN UTENSIL

BACKGROUND OF THE INVENTION

1. Field of the Invention

This invention relates generally to a rotary kitchen utensil and especially to a food processing apparatus.

In particular, the device of this invention concerns a handheld, manually operable comminutor.

2. Description of the Prior Art

Conventional culinary devices used for the processing of food substances varied greatly from manually manipulated basic implements having sharpened edges or blades to more elaborate electrical appliances having interchangeable blade attachments for performing a plurality of operations.

A disadvantage of these hand-held devices of the prior art was that they did not have any mechanical advantage and hence, in use, required in some cases considerable physical exertion. As a result, these previous kitchen implements were not widely accepted or efficient in operation.

On the other hand, those devices operated by electric motors were relatively expensive in comparison, were heavier in weight and more cumbersome. In addition, they usually required more space for storage, and the routine cleaning, maintanance and frequency of repair for some of these devices were a distinct and inherent shortcoming.

The rotary kitchen utensil of this invention, in contrast, provides a fully portable mechanical device which is manually operable and does not require an electric motor or outside power source. Another advantage of this invention concerns the use of a sealed rotary drive mechanism which is isolated from contact with the food substances and thus does not require continued cleaning and lubrication for smooth and efficient operation. Furthermore, the food substance being acted upon cannot be contaminated and conversely the food particles will not interfere with the operation of the drive mechanism. Another advantage of this invention concerns the adaptability for the selective accommodation of several different and interchangeable blades, each of which can be designed for a specific food processing function. The adaptability for snap fit replacement or substitute blades will thus enhance the applied applications for this device and is another singular advantage over prior devices such as illustrated in U.S. Pat. No. 427,473, U.S. Pat. No. 2,575,978, and U.S. Pat. No. 400,547.

SUMMARY OF THE INVENTION

Briefly, the nature of this invention concerns a handheld, manually operable, rotary kitchen utensil. The intended purpose of this device is to provide an apparatus suitable for performing a plurality of food processing operations such as mashing, mixing, stirring, blending, whipping, agitating, folding, and beating, as well as other applications which will become apparent to the user.

The apparatus of this invention is further intended to provide a device which is mechanically reliable, easy to clean, efficient to operate, and requires a minimum of storage space. In order to accomplish these purposes the device has been designed with a manually operable drive mechanism for rotating a blade subassembly. The drive mechanism incorporates a spring loaded spindle having a helical groove. The spindle is mounted within a tubular protective sleeve having a rib projection at one end which is engaged within the spindle groove. The opposite end of the tubular sleeve is secured within a handle member. Upon application of a substantially downward force upon the handle, the tubular sleeve is telescopically slidable into a barrel section of the blade subassembly. This linear displacement of the tubular sleeve and spindle effects a rotation of the spindle which is attached to a circular blade. A plurality of arcuate support bands extend from the blade to the barrel section and form auxiliary food mixing elements.

It should be apparent that the blade subassembly including the barrel section, circular blade and arcuate bands forming food mixing elements rotates as a unit in one direction as the handle is displaced downward. Conversely, rotation will take place in an opposite direction as the tubular sleeve and enclosed spindle are spring urged upwardly to its initial position.

The enclosure of the helical drive mechanism in the tubular sleeve insulates these mechanical parts from contact with or contamination of food substances being mixed.

In addition, this invention also encompasses the selective use of interchangeable blade members.

It should be further noted that the food substance is acted upon by the combined downward pressure of the surface of the circular blade, a plurality of cutting edges around the periphery of the blade and the arcuate food mixing elements. This device can thus be used for performing a wide range of food processing functions and provides a portable, lightweight, mechanical apparatus which is relatively trouble-free to operate.

From the foregoing, it will be appreciated that it is an object of the present invention to provide a rotary kitchen utensil which is not subject to the aforementioned disadvantages.

An object of this invention is to provide a rotary kitchen utensil suitable for multifunctional food processing purposes.

It is a further object of the present invention to provide a rotary kitchen utensil having a helical drive mechanism for manual operation.

Another object of the present invention is to provide a rotary kitchen utensil having a sealed drive mechanism which is not exposed to the food being mixed.

A still further object of the present invention is to provide a rotary kitchen utensil having selectively attachable blades.

Yet another object of the present invention is to provide a a rotary kitchen utensil which is simple in construction, low in cost, reliable in use and well adapted for mass production fabrication techniques.

Other objects of this invention in part will be apparent and in part will be pointed out hereinafter.

With these ends in view, the invention finds embodiment in certain combinations of elements, and arrangements of parts by which the aforementioned objects and certain other objects are hereinafter attained, all as fully described with reference to the accompanying drawings and the scope of which is more particularly pointed out and indicated in the appended claims.

BRIEF DESCRIPTION OF THE DRAWINGS

In the accompanying drawings in which are shown some of the various possible exemplary embodiments of the invention:

FIG. 1 is a front elevational view of a rotary kitchen utensil in accordance with this invention with portions broken away to show a spring urged spindle having a helical groove enclosed within a slidable tubular protective sleeve and a blade subassembly including barrel section, blade member and arcuate bands extending from the barrel section to the blade member; and FIG. 2 is a partial view shown in exploded fashion of the rotary kitchen utensil of FIG. 1 and shows in detail the spindle within the tubular sleeve engaged by the rib projection for rotating the spindle as displaced within the barrel section; in addition the blade attachment to the spindle is illustrated;

FIG. 3 is a sectional view taken substantially along lines 3—3 of FIG. 2 and shows the rib projection engaged within the helical groove of the spindle; and FIG. 4 is a plan view taken substantially along line 4—4 of FIG. 1 showing the circular blade to a slightly reduced scale.

DETAILED DESCRIPTION OF THE PREFERRED EMBODIMENT

Referring now to the drawings, there is illustrated in FIG. 1 a rotary kitchen utensil denoted generally by the reference numeral 10 and embodying the present invention.

As previously discussed, the rotary kitchen utensil 10 is designed to provide a portable lightweight device having a manually operated, self-contained drive mechanism for rotating a blade subassembly. The rotary kitchen utensil will be hereinafter described with reference to its use as a mashing and mixing device, however it should be understood and will be apparent from the following description that it is adapted for multifunctional culinary operations and as such can be used for blending, beating, stirring, whipping or otherwise processing food substances.

The mechanical drive mechanism employs a spindle 12 housed within a slidable tubular member or protective sleeve 14. One end of the sleeve 14 is frictionally secured by insertion into a handle member 16, and the opposite end of the sleeve 14 is slidably accommodated within a barrel section 18 forming part of the blade subassembly.

A lower portion of the wall of the sleeve 14 is provided with a projecting rib 20 adapted to be received within a helical groove 22 formed in the spindle 12. The upper end of the spindle 12 includes a spring guide 24 for positioning and retaining a compression spring 26. The spring 26 urges the sleeve 14 and handle 12 to an initial position such as shown in FIG. 1.

The lower end of the spindle 12 is provided with an externally threaded boss 28 for engaging a cap 30 which seals the lower end of the barrel section 18. The boss 28 is further provided with an internally threaded bore 32 adapted to receive a hexagonal socket head bolt 34.

Considering next the blade subassembly, a substantially planar circular blade 36 has been shown; although this is a preferred configuration, other shapes, especially with regard to replacement blades, can be utilized and would fall within the scope of this invention.

As illustrated in FIG. 4 which shows a plan view of the blade 36 of FIG. 1 to a slightly reduced scale, there is provided a plurality of open segments 38 such that food particles can pass through the blade 38 as a downward mashing pressure is applied by the handle 12.

In addition, the periphery of the blade 38 is provided with a plurality of upstanding cutting elements 40, 42, 44, 46. The cutting elements 40, 42, 44, 46 are further supported by a plurality of corresponding arcuate bands 48, 50, 52, 54 which provide supplementary mixing elements. The upper ends of the arcuate bands 48, 50, 52, 54 are secured to the barrel section 18 by a collar member 56 or can be formed integrally therewith. In this preferred embodiment, the arcuate bands 48, 50, 52, 54 are made of a spring flexible material and are provided with studs 58, 60, 62, 64 which can be inserted into corresponding openings in each of the cutting surfaces 40, 42, 44, 46 for snap fit engagement. The blade 36 can thus be releasably secured in position. It is also contemplated that the blade 36 can be permanently affixed as by means of rivet type fasteners.

The blade 36 is further secured to the spindle 12 by the bolt 34 which is passed through a hexagonal opening 66 in the blade 36, and a washer 68 can be employed as shown in FIG. 2.

The complementary or keyed fit between the opening 66 and the hexagonal head of the socket bolt 34 insure that the blade 36 will rotate with the spindle 12. Furthermore, the semispherical head of the socket bolt 34 can be placed on a support surface during use and will provide a pivot. It should be apparent that the blade 36 can be readily removed by releasing studs 58, 60, 62, 64 and sliding the blade 36 off the bolt 34 without the need for a screw driver, wrench or special tool.

In operation, a downward force is applied to the handle 12 causing the sleeve 14 to be slidably displaced within the barrel 18 and the spring 26 to be compressed. As the sleeve 14 is displaced downward co-acting with the spindle 12 therein, the rib 20 will effectively rotate the spindle 12. The blade 36 is secured to the spindle 12 and will rotate about the head of the bolt 34 which serves as a pivot point. It should be obvious that the barrel 18 and arcuate bands 48, 50, 52, 54 forming food mixing elements will rotate in unison with the blade 36. The downward displacement of the slidable sleeve 14 is limited by the handle 12 contact with the barrel 18 which functions as an abutment or stop. Upon release of the downward pressure, the compression spring 26 will restore the slidable sleeve 14 to its initial position causing a reverse rotation of the spindle 12 and blade 26. The reciprocal up and down movement of the handle 12 will effect respective clockwise and counterclockwise motion as denoted by the double-headed arrow in FIG. 2.

As previously discussed, the rotating food contact surfaces include the planar portion of the circular blade 36 which serves as a mashing implement, the upstanding cutting elements 40, 42, 44, 46 of the blade 36, the plurality of arcuate bands 48, 50, 52, 54 forming food mixing elements and the barrel section 18. If it is desired to replace the circular blade 36 or to substitute another blade element having different physical characteristics for performing a specified function, the removal and insertion of this substitute blade can be performed relatively quickly and easily. Furthermore, the spindle 12 can be treated with an appropriate lubrication so that the rib 20 will slide smoothly within the helical groove 22.

Thus, it will be seen that there is provided a rotary kitchen utensil which achieves the various objects of the invention and which is well adapted to meet the conditions of practical use.

Since various possible embodiments might be made of the present invention and various changes might be made in the exemplary embodiments set forth, it is to be understood that all material shown and described in the accompanying drawings is to be interpreted as illustrative and not in a limiting sense.

Having thus described the invention, there is claimed as new and desired to be secured by Letters Patent:

1. A hand-held kitchen utensil adapted for processing foods comprising manually operable drive means for converting linear to rotary motion, said drive means being coupled to a blade subassembly for rotation therewith in each of two directions, said drive means being housed within a protective tubular sleeve to prevent contact with the food substances being processed, the blade subassembly further having a barrel section interfitting with said tubular sleeve whereby the tubular sleeve is received within the barrel section during vertical displacement thereof.

2. A kitchen utensil as claimed in claim 1 wherein the drive means includes a spindle, said spindle having a helical groove extending therealong, rib means projecting from said tubular sleeve, said rib means being received within said helical groove whereby the spindle will be caused to rotate during linear displacement of the tubular sleeve.

3. A kitchen utensil as claimed in claim 2 further including handle means at one end of the tubular sleeve for applying a vertically directed force toward the blade subassembly wherein the slidable sleeve is telescopically displaced within the barrel section.

4. A kitchen utensil as claimed in claim 2 further including spring means within the tubular sleeve, said spring means acting upon the spindle for returning the slidable sleeve to its initial position after the vertically directed downward force is removed.

5. A kitchen utensil as claimed in claim 4 wherein the spindle further includes spring guide means at its upper end for positioning and retaining the spring and engagement means at its lower end for securement to the barrel section whereby the barrel section will rotate simultaneously with the spindle.

6. A kitchen utensil as claimed in claim 5 wherein the blade subassembly includes a circular blade member, a plurality of arcuate bands extending from the barrel section and releasably attached to the blade member, said arcuate bands forming auxiliary food mixing elements.

7. A kitchen utensil as claimed in claim 6 wherein the blade member further contains upstanding cutting surfaces along the periphery of the blade for contact with the food substances being acted upon.

8. A kitchen utensil as claimed in claim 7 wherein the arcuate bands are spring urged and provided with studs, said studs being engageable in corresponding openings formed in the upstanding cutting surfaces whereby the blade member can be removably secured to the bands.

9. A kitchen utensil as claimed in claim 8 wherein the blade member is provided with a keyed opening for complementary fit with the head of a bolt affixed to the spindle whereby the blade is rotatable with the spindle and selectively attachable thereto.

10. A kitchen utensil as claimed in claim 9 wherein the bolt head is semispherical and provides a pivot for rotation of the blade member.

* * * * *